W. M. POTTER.
LAWN MOWER.
APPLICATION FILED APR. 16, 1909.
956,601.
Patented May 3, 1910.
2 SHEETS—SHEET 1.
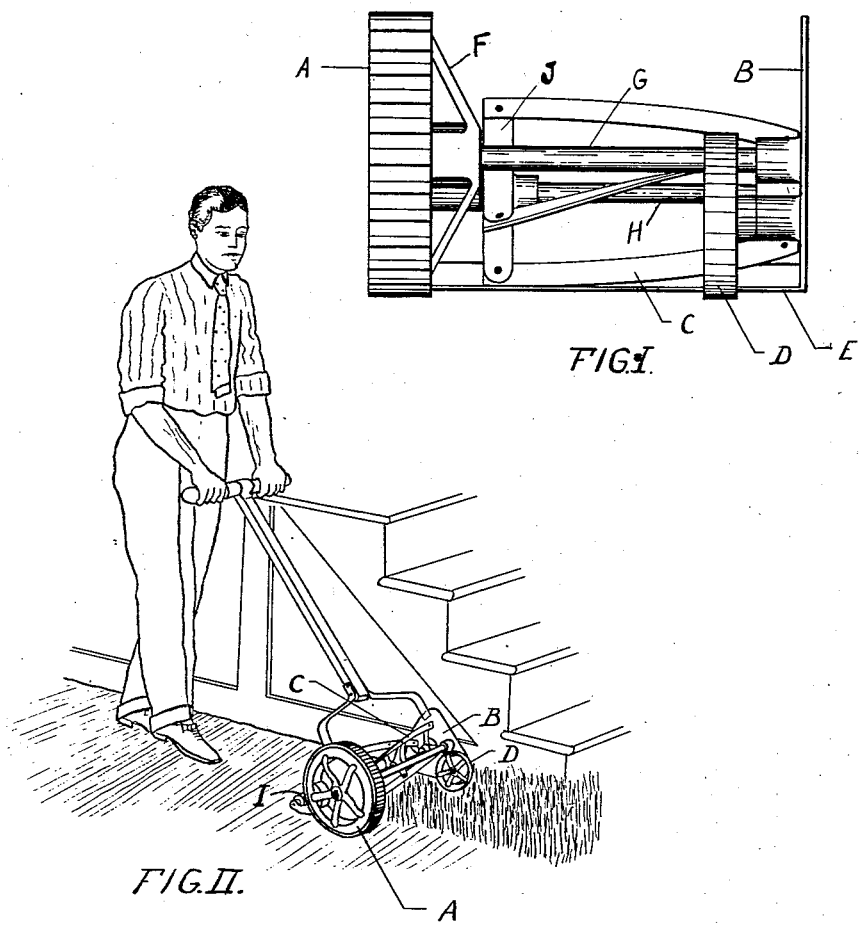
WITNESSES
W. M. Potter
INVENTOR W. M. POTTER.
LAWN MOWER.
APPLICATION FILED APR. 16, 1909.
956,601.
Patented May 3, 1910.
2 SHEETS—SHEET 2.
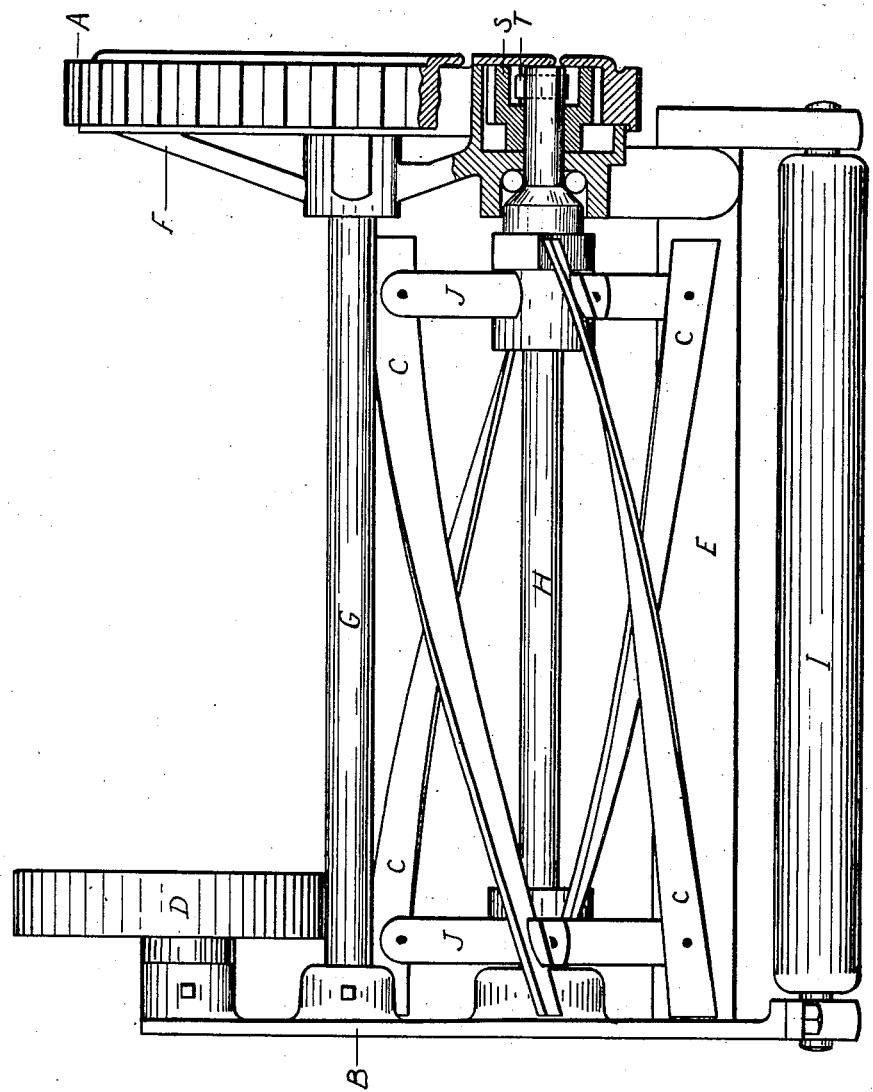
FIG. III
WITNESSES
INVENTOR

UNITED STATES PATENT OFFICE.

WILLIAM M. POTTER, OF SYRACUSE, NEW YORK, ASSIGNOR TO E. C. STEARNS & CO., OF SYRACUSE, NEW YORK.

LAWN-MOWER.

956,601.  Specification of Letters Patent.  Patented May 3, 1910.

Application filed April 16, 1909. Serial No. 490,295.

*To all whom it may concern:*

Be it known that I, WILLIAM M. POTTER, citizen of the United States, residing in the city of Syracuse, in the county of Onondaga, in the State of New York, have invented certain new and useful Improvements in Lawn-Mowers, of which the following is a specification.

My invention applies to rotary lawn mowers such as are commonly employed for trimming lawns.

The invention consists of a construction in which the rotary cutter is driven by gearing from one end only, the other end being journaled into a thin, flat plate the lower edge of which is kept level and free from the ground by a supporting wheel running ahead of the cutter and a roller running behind. Furthermore, the construction permits building the machine wide enough to do the service of a regular lawn mower as well as that of a trimmer.

The objects of my invention are to provide a simple, cheap and practical machine which will trim up close around obstructions as well as efficiently cutting the remainder of the lawn, and to produce a construction which will permit the use of a driving wheel on one end only by providing suitable means for keeping the other end in its correct relative position with the ground.

Figure 1 is a front elevation of my mower showing the relation of the plate B and the supporting wheel D to the other parts. Fig. 2 is a perspective view of the mower in operation in a place not accessible to a common mower. Fig. 3 is a plan view showing a portion of the mower broken away to more clearly show the driving mechanism.

The frame or stationary part of my mower consists of a thin, flat plate B and a side piece F connected by the tie rod G. Journaled into the plate B at one end and into the side piece F at the other is the shaft H upon which the spiders J, carrying the rotating knives C, are immovably fastened. The stationary knife E extends transversely across the mower and is attached at one end to the flat plate B and at the other end to the side piece F in such a position that its forward edge is just touched by the rotating knives C as they pass. The traction wheel A is journaled upon the side piece F. On the inner surface of the rim of the said traction wheel an annular gear is formed which meshes with the small pinion S loosely mounted on the shaft H and driving it in one direction only by means of the dog T. At the other side of the mower frame the supporting wheel D is journaled to the plate B slightly ahead of the rotating knives and the tie rod G. The roller I extends across the rear of the machine and is freely journaled at each end into the frame.

In operating the mower around obstructions it is pushed in such a direction that the flat side is kept next the obstruction. The knives rotate so close to the plate and the plate is so thin no grass escapes cutting. The wheel D in front and the roller I behind keep the stationary knife always at the correct distance from the ground even when the ground is uneven. Also the operator can by either raising or depressing the handle lift the cutting knives from the ground and pass over roots, stones or other obstructions. In trimming around a sidewalk the advantage of having both the wheel D and the roller I is particularly noticeable. The plate B moves about even with the edge of the sidewalk, but the wheel D being nearer the center of the mower runs on the grass and keeps the knives from digging into the ground even though there be a considerable ditch around the walk. The roller supports the rear as in ordinary mowers. The wheel D is narrow enough not to mat down the grass to any great extent.

Having thus described my invention I claim as new and desire to secure by Letters Patent:

1. In a lawn mower, a casing-plate arranged on one side of the machine, a thin plate arranged on the opposite side and a tie-rod connecting said plates, said plates and tie rod forming the frame, and in combination therewith a single drive wheel journaled on the casing plate, a fixed knife supported on the frame, a shaft journaled between the plates, a ball-bearing for the shaft, curved knives fixed on the shaft, operative connections between the drive-wheel and the shaft, a roller journaled between the plates at the rear of the machine, and a supporting guide wheel journaled in the thin plate at the front of the machine.

2. In a lawn mower, the combination with a casing-plate arranged on one side of the machine, a thin plate arranged on the opposite side and a tie-rod connecting said plates, of a single drive wheel journaled on the casing plate, a fixed knife supported between the plates, a rotary cutter journaled between the plates, operative connections between the drive-wheel and the cutter, an elongated roller journaled between the plates at the rear of the machine, and a supporting guide wheel journaled in the thin plate at the front of the machine, said supporting guide wheel being arranged on the inner face of the thin plate, substantially as shown.

In testimony whereof I sign my name in the presence of two witnesses.

W. M. POTTER.

Witnesses:
 WALTER A. PAPWORTH,
 W. P. HALL.